United States Patent [19]
Kachich

[11] Patent Number: 5,890,848
[45] Date of Patent: Apr. 6, 1999

[54] METHOD AND APPARATUS FOR SIMULTANEOUSLY LUBRICATING A CUTTING POINT OF A TOOL AND CONTROLLING THE APPLICATION RATE OF THE TOOL TO A WORK PIECE

[75] Inventor: Albert J. Kachich, Katy, Tex.

[73] Assignee: Cooper Technologies Company, Houston, Tex.

[21] Appl. No.: 906,591

[22] Filed: Aug. 5, 1997

[51] Int. Cl.[6] ............................. B23B 35/00; B23B 45/00
[52] U.S. Cl. ............................. 408/1 R; 408/61; 408/130
[58] Field of Search ................................ 408/1 R, 56, 61, 408/97, 130

[56] References Cited

U.S. PATENT DOCUMENTS

| Re. 33,711 | 10/1991 | Ono et al. ............................. 81/464 |
| 942,163 | 12/1909 | Berner . |
| 2,233,163 | 2/1941 | Fosnot ................................. 121/35 |
| 2,257,893 | 10/1941 | Van Sittert et al. ................ 121/34 |
| 2,261,204 | 11/1941 | Amstberg ........................... 121/34 |
| 2,285,638 | 6/1942 | Amstberg .......................... 192/30.5 |
| 2,339,530 | 1/1944 | Van Sittert et al. .............. 192/30.5 |
| 2,373,664 | 4/1945 | Emery ................................. 192/30.5 |
| 2,399,251 | 4/1946 | Porter ................................. 192/30.5 |
| 2,543,979 | 3/1951 | Maurer ............................... 192/150 |
| 2,580,631 | 1/1952 | Whitledge ......................... 192/30.5 |
| 2,727,598 | 12/1955 | Mitchell et al. ................. 192/0.034 |
| 2,768,546 | 10/1956 | Amstberg ........................... 81/52.3 |
| 2,784,819 | 3/1957 | Reynolds ........................... 192/30.5 |
| 2,893,276 | 7/1959 | Quackenbush ...................... 77/34.4 |
| 2,973,068 | 2/1961 | Sturrock .......................... 192/0.096 |
| 2,974,553 | 3/1961 | Donowick ........................... 81/52.3 |
| 2,980,218 | 4/1961 | Young ................................. 192/30.5 |
| 3,027,152 | 3/1962 | Deschner ................................ 267/1 |
| 3,030,839 | 4/1962 | Schadlich ............................. 81/52.3 |
| 3,088,445 | 5/1963 | Gardner ................................. 123/41 |
| 3,093,360 | 6/1963 | Krouse ................................... 253/2 |
| 3,170,523 | 2/1965 | Short ................................... 173/104 |
| 3,174,559 | 3/1965 | Vaughn ................................. 173/12 |
| 3,191,404 | 6/1965 | Schivley, Jr. ........................... 64/26 |
| 3,199,314 | 8/1965 | Schrader ................................. 64/26 |
| 3,244,013 | 4/1966 | Deschner .............................. 74/18.2 |
| 3,298,481 | 1/1967 | Schaedler et al. ................. 192/0.034 |
| 3,398,609 | 8/1968 | Schott ................................... 408/61 |
| 3,411,385 | 11/1968 | Quackenbush ........................ 77/32.8 |

(List continued on next page.)

FOREIGN PATENT DOCUMENTS

| 0079319A1 | 10/1982 | European Pat. Off. . |
| 0665087A1 | 1/1995 | European Pat. Off. . |
| 0676262A1 | 3/1995 | European Pat. Off. . |
| 0759340A1 | 8/1995 | European Pat. Off. . |
| 0719618A1 | 1/1996 | European Pat. Off. . |
| 0721823A1 | 1/1996 | European Pat. Off. . |
| 0739689A1 | 10/1996 | European Pat. Off. . |
| 1042954 | 9/1983 | U.S.S.R. ................................ 408/61 |
| 126620 | 1/1920 | United Kingdom ................... 408/56 |
| WO96/11090 | 10/1995 | WIPO . |

OTHER PUBLICATIONS

Catalog—Deschner Kinecheks "Speed Regulators for Moving Devices" ©1988.

Catalog—Industrial Tool Division, INDRESCO, "Operating Instructions and Service Manual Quackenbush," © 1995.

Catalog—Intool Incorporated, "Operating Instructions and Service Manual Cleco," © 1996.

Primary Examiner—Daniel W. Howell
Attorney, Agent, or Firm—Burns, Doane, Swecker & Mathis, L.L.P.

[57] ABSTRACT

An apparatus and method are disclosed for controlling the rate of application of a machine tool to a work piece by compressing a lubricating agent, and then distributing the compressed lubricating agent to lubricate and cool a cutting point of the machine tool. A rod (15) translates axial forces from the machine tool (170) to compress a lubricating agent provided in a compression chamber (70). The pressurization of the lubricating agent creates a counter force to regulate the motion of the machine tool (170), and also forces a lubricating mist out of an exhaust opening (75) which can be directed by an air passage (80) to any point where lubrication is desired.

20 Claims, 2 Drawing Sheets

U.S. PATENT DOCUMENTS

| | | | |
|---|---|---|---|
| 3,411,593 | 11/1968 | Quackenbush | 173/145 |
| 3,413,875 | 12/1968 | Larson | 408/61 |
| 3,429,206 | 2/1969 | Quackenbush | 77/34.7 |
| 3,515,225 | 6/1970 | States | 173/12 |
| 3,515,251 | 6/1970 | Clapp | 192/150 |
| 3,574,290 | 4/1971 | Eckman | 408/9 |
| 3,592,274 | 7/1971 | Young | 173/93.6 |
| 3,608,131 | 9/1971 | Hornschuch et al. | 173/12 |
| 3,616,864 | 11/1971 | Sorensen | 173/12 |
| 3,667,345 | 6/1972 | Schaedler et al. | 91/59 |
| 3,703,933 | 11/1972 | Schoeps | 173/12 |
| 3,710,873 | 1/1973 | Allen | 173/12 |
| 3,741,313 | 6/1973 | States | 173/12 |
| 3,797,583 | 3/1974 | Quackenbush | 173/4 |
| 3,833,068 | 9/1974 | Hall | 173/169 |
| 3,951,217 | 4/1976 | Wallace et al. | 173/169 |
| 3,960,035 | 6/1976 | Workman et al. | 74/785 |
| 3,989,113 | 11/1976 | Spring, Sr. et al. | 173/163 |
| 3,989,405 | 11/1976 | Quackenbush | 408/11 |
| 4,019,589 | 4/1977 | Wallace | 173/12 |
| 4,109,735 | 8/1978 | Bent | 173/163 |
| 4,223,745 | 9/1980 | Workman, Jr. | 173/12 |
| 4,243,109 | 1/1981 | Anderson | 173/93.5 |
| 4,257,499 | 3/1981 | Deschner | 188/287 |
| 4,286,902 | 9/1981 | Gagliano et al. | 408/79 |
| 4,291,771 | 9/1981 | Perraud | 173/106 |
| 4,307,784 | 12/1981 | Smith | 173/12 |
| 4,320,806 | 3/1982 | Koltermann et al. | 173/12 |
| 4,359,107 | 11/1982 | Smith | 173/12 |
| 4,379,492 | 4/1983 | Hiraoka | 173/12 |
| 4,396,318 | 8/1983 | Jensen et al. | 408/95 |
| 4,418,764 | 12/1983 | Mizobe | 173/12 |
| 4,467,877 | 8/1984 | Koltermann et al. | 173/12 |
| 4,480,699 | 11/1984 | Elmer | 173/12 |
| 4,546,833 | 10/1985 | Berecz et al. | 173/12 |
| 4,586,884 | 5/1986 | Berger et al. | 418/43 |
| 4,591,299 | 5/1986 | Eckman | 408/1 R |
| 4,592,681 | 6/1986 | Pennison et al. | 408/10 |
| 4,631,992 | 12/1986 | Eckman | 81/470 |
| 4,681,490 | 7/1987 | Pennison et al. | 408/10 |
| 4,683,961 | 8/1987 | Schoeps | 173/93 |
| 4,693,322 | 9/1987 | Gartside | 173/116 |
| 4,718,500 | 1/1988 | Mori | 173/132 |
| 4,767,151 | 8/1988 | Agostini | 296/97 K |
| 4,767,379 | 8/1988 | Schoeps | 464/25 |
| 4,772,186 | 9/1988 | Pyles et al. | 418/43 |
| 4,822,264 | 4/1989 | Kettner | 418/150 |
| 4,844,177 | 7/1989 | Robinson et al. | 173/12 |
| 4,854,916 | 8/1989 | Schoeps et al. | 464/25 |
| 4,880,064 | 11/1989 | Willoughby et al. | 173/12 |
| 4,884,995 | 12/1989 | Schoeps | 464/25 |
| 4,919,022 | 4/1990 | Ono et al. | 81/464 |
| 5,080,181 | 1/1992 | Tatsuno | 173/93.5 |
| 5,082,066 | 1/1992 | Schoeps | 173/12 |
| 5,083,619 | 1/1992 | Giardino et al. | 173/93 |
| 5,092,410 | 3/1992 | Wallace et al. | 173/93.5 |
| 5,094,303 | 3/1992 | Jenne | 173/91 |
| 5,147,245 | 9/1992 | Schoepps | 464/25 |
| 5,163,519 | 11/1992 | Mead et al. | 173/91 |
| 5,172,771 | 12/1992 | Wilson | 173/1 |
| 5,181,545 | 1/1993 | Koshikawa et al. | 140/92.1 |
| 5,228,523 | 7/1993 | Rahm | 173/219 |
| 5,327,636 | 7/1994 | Wilson | 29/525 |
| 5,346,022 | 9/1994 | Krivec | 173/178 |
| 5,346,023 | 9/1994 | Takagi et al. | 173/178 |
| 5,377,769 | 1/1995 | Hasuo et al. | 173/169 |
| 5,429,553 | 7/1995 | Schoeps | 464/25 |
| 5,492,185 | 2/1996 | Schoeps et al. | 173/177 |
| 5,544,710 | 8/1996 | Groshans et al. | 173/176 |
| 5,558,168 | 9/1996 | Rahm | 173/178 |
| 5,567,886 | 10/1996 | Kettner | 73/862.23 |

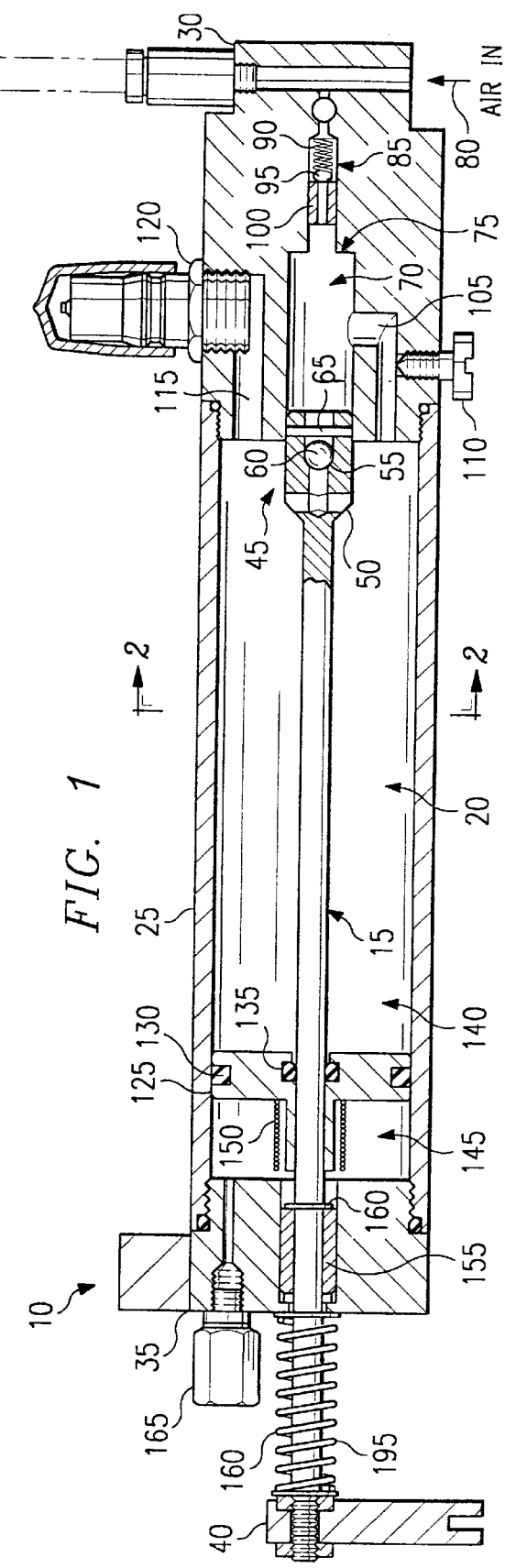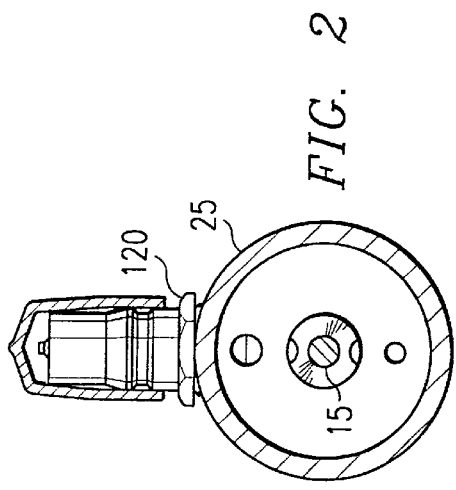

METHOD AND APPARATUS FOR SIMULTANEOUSLY LUBRICATING A CUTTING POINT OF A TOOL AND CONTROLLING THE APPLICATION RATE OF THE TOOL TO A WORK PIECE

TECHNICAL FIELD OF THE INVENTION

This invention relates in general to the field of controlling the application of machine tools, and more particularly to controlling the application rate of a cutting tool to a work piece by compressing a lubricant/coolant and simultaneously providing a mist of the lubricant/coolant to the cutting point of the tool.

BACKGROUND OF THE INVENTION

Parts for mechanical devices, such as airplanes or automobiles, are often machined from pieces of metal or other hard substances with machine tools such as drills. For instance in the aircraft industry, wing and fuselage parts are cut to design specifications from pieces of aluminum and then further drilled and reamed to allow attachment with related wing and fuselage parts.

Parts must often be machined to exact tolerances. However, the process of cutting and drilling metal can often introduce imperfections. For instance, machining metal creates heat which can warp the metal and can deteriorate the cutting point of the machine tools being used. To limit the effects of heat and the deterioration of cutting points, machinists commonly use lubricating devices to lubricate and cool the cutting point of the machine tool as it cuts or drills the metal. For instance, the Quackenbush air-powered drill sold by Intool Incorporated has a mist lubricator which directs a mist of lubricant/coolant at the work piece through a ported head attached near the cutting point of the drill bit. Air pressure forces a lubricating agent from a reservoir into a separate air stream which is directed to ports that meter out predetermined amounts of selected lubricating agents against the cutting point of the drill in the form of a mist. This lubricating mist decreases the heat produced by the cutting or drilling process and also helps to preserve the life of the cutting point. However, this mist lubricator is bulky and inconvenient because it uses separate air lines to supply air pressure to force lubricant from the reservoir that holds the lubricant supply and to pick up the lubricant for distribution to the cutting point of the drill.

Imperfections can also be introduced in the machining process by sudden or irregular movements of the machining tools. When precise tolerances are needed for machine jobs, machinists often use hydraulic feed controls to control the rate of application of the machine tool to the work piece. Hydraulic feed controls are typically attached to the machine tool and have a plunger that rests against the work piece being machined. When force is applied against the plunger, for instance by the application of a drill to a work piece, the plunger compresses hydraulic fluid in a cylinder to provide a counter-force which ensures that the machine tool will not move at an excessive rate. Thus, for instance, a machinist drilling through a material can avoid the sudden movements which often occur when a drill meets reduced resistance as it passes through the material. Such hydraulic feed controls are sold by Deschner Corporation under the trade name KINECHEKS®, and are disclosed in U.S. Pat. No. 3,027,152, U.S. Pat. No. 3,244,013, and U.S. Pat. No. 4,257,499, each by Deschner. These devices are built to withstand large forces without leaking any hydraulic fluids.

In the aircraft industry it is common to have both a KINCHEK® device and a mist lubricator attached to a drill when holes are drilled through a material. However, these accessories add weight and can reduce the versatility of the drill. For instance, the drill, lubricant reservoir and mist distribution ports can each require a separate air line, and the lubricant and KINECHEK® devices each have separate reservoirs for storing hydraulic or lubricating fluid. In addition, having two devices increases the expense of the machining process. KINECHEK® devices in particular add expense because they are built with heavy-duty seals that will withstand large forces without leaking. Further, having two devices complicates the machining process since the machinist must understand both devices and incorporate each device in his operation. For instance, the machinist must generally initiate the flow of mist lubricants by a step separate from the initiation of the drilling process itself by supplying air to the lubricant reservoir and the distribution ports.

SUMMARY OF THE INVENTION

Therefore, a need has arisen for an apparatus and a method to control the rate at which a machine tool is applied to a work piece and to simultaneously lubricate the cutting point of the machine tool while minimizing any interference with the operation of the machine tool.

In accordance with the present invention, a controlled stroke lubricant injector is provided that substantially eliminates or reduces disadvantages and problems associated with previously developed devices for controlling the rate of application of a machine tool to a work piece and lubricating the machine tool. The application of the tool to the work piece creates an axial force which is translated by a pressure member to a compression piston. The compression piston compresses lubricating agent in a compression chamber formed in a pressure head. The compression of the lubricating agent creates a counter force which regulates the rate of application of the tool and also forces lubricating agent through an exhaust opening communicating between the compression chamber and an air passage. The air passage accepts the lubricating agent and transports the lubricating agent to a lubrication point, such as the cutting point of the tool.

More specifically, the present invention provides a pressure head having a compression chamber with an insertion opening and an exhaust opening. A compression piston is inserted into the insertion opening of the compression chamber for compressing a lubricating agent located in the compression chamber. The compression piston is coupled to a rod which cooperates through a link with a machine tool, such as a hand held air-powered drill. As a drill bit associated with the drill is applied to a work piece, the rod translates the axial force created by the tool's application to compress the lubricating agent present in the compression chamber. This compression causes a counter force against the application of the tool and also causes the lubricating agent to pass from the compression chamber through the exhaust opening and into an air passage adjacent to the exhaust opening. The air passage accepts pressurized air from an air pressure source and provides the pressurized air past the exhaust opening and out a distribution port which is directed at the cutting point of the drill. Upon completing a full stroke, the tool is removed from the work piece, allowing a spring to reset the rod to an initial position for another application. A reset valve in the compression piston allows rapid fluid displacement from a reservoir to the compression chamber to ensure rapid reset of the rod as the compression chamber is refilled with lubricating agent. A reservoir piston disposed in the reservoir ensures that lubricating agent will be supplied to the reset valve regardless of the vertical or horizontal orientation of the controlled stroke lubricant injector.

The present invention provides important technical advantages by the combination of a feed control and a mist lubricator in a single versatile tool. For instance, the present invention can perform both rate control and lubrication functions using fewer parts than are used by separate tools. Thus, the present invention is less expensive to build, easier to use, lighter and more reliable than separate tools.

The present invention provides another technical advantage by using the force of the application of a machine tool to distribute a lubricant. The lubricant can be effectively distributed to a cutting point in a mist with a single air supply, making the machine tool more efficient in distributing lubrication. For instance, the lubricant is not wasted by misting when not drilling.

The present invention provides another important technical advantage by using a single fluid to create a counter force and to lubricate the cutting point of the tool. The compression of a lubricating agent to create a counter force allows the present invention to use a single reservoir to store the fluid, instead of separate reservoir for the hydraulic fluid and the lubricant. Thus, the present invention has a reduced size, weight, complexity and expense for a given supply of lubricant. Further, because the feed control of the present invention is designed to distribute fluid, it may be constructed with less sturdy seals and other parts than may be used with leak-proof feed controllers.

The present invention provides another important technical advantage by reducing the complexity of the machining process. The present invention can initiate distribution of a lubricating mist without including an extra step in the machining process. The mist can automatically flow when an axial pressurizing force is applied to the machine tool, and can automatically cease flowing when the axial pressurizing force is removed from the machine tool. Further, the machinist can easily adjust the feed control and mist functions to so that the controlled stroke lubricant injector performs only the feed control or lubricant functions.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 is a schematic sectional side view of one embodiment of the present invention;

FIG. 2 is a schematic sectional drawing of a front view of the present invention taken at point 2 of the embodiment of FIG. 1.

DETAILED DESCRIPTION OF THE INVENTION

Figure 3:
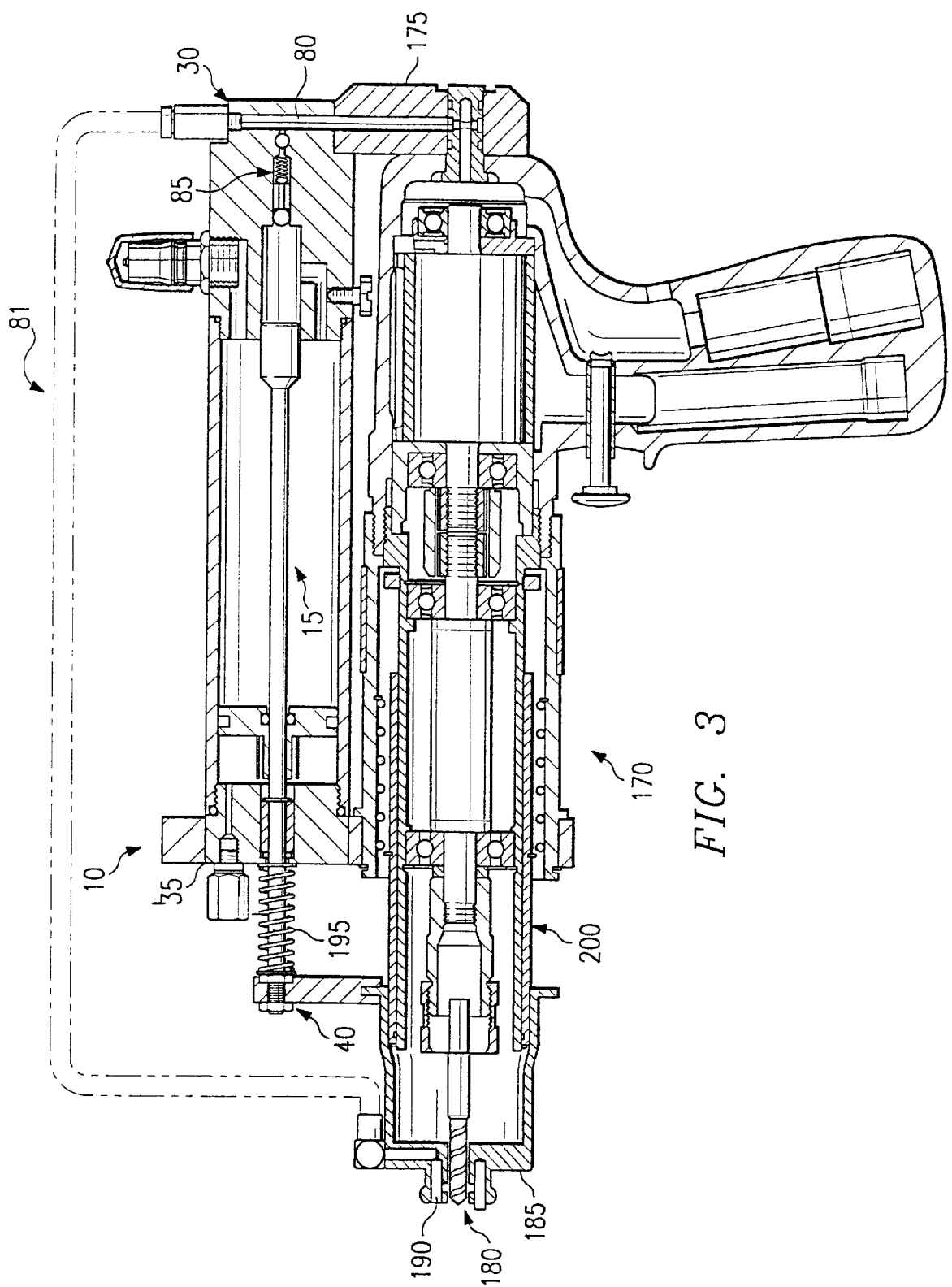
FIG. 3 is a schematic sectional drawing of a side view of one embodiment of the present invention attached to a hand held air-powered drill.

Preferred embodiments of the present invention are illustrated in the figures, like numerals being used to refer to like and corresponding parts of the various drawings.

A controlled stroke lubricant injector is provided which regulates the application of a machine tool to a work piece by creating a counter force to the movement of the tool against the work piece. The creation of this counter force also compresses a lubricating agent and causes the lubricating agent to proceed through an air passage with the assistance of pressurized air so that the lubricating agent can be applied to any lubrication point of the tool, such as a cutting point, where lubrication is desired.

Referring now to FIG. 1, one embodiment of a controlled stroke lubricant injector 10 is depicted. A rod 15 is disposed through the interior of a reservoir 20. Reservoir 20 is formed by a cylindrical housing 25 placed between a pressure head 30 and an end cap 35. Rod 15 acts as a pressure member which transfers axial forces through a link 40 to a compression piston 45 formed at the end of rod 10. A reset valve 50 provides a passage from reservoir 20 through rod 15 to the end of compression piston 45. Reset valve 50 comprises an increased diameter within compression piston 45 to form a seat 55 which accepts a ball 60. A rod pin 65 inserted across the opening of reset valve 50 retains ball 60 within compression piston 45. Reset valve 50 has an open position to allow fluid to flow from reservoir 20 through reset valve 50 when rod 15 experiences a reset force that withdraws rod 15 towards reservoir 20. Reset valve 50 also has a closed position to prevent fluid from flowing through reset valve 50 into reservoir 20 when rod 15 experiences a compression force that pushes rod 15 out of reservoir 20.

Pressure head 30 is coupled to cylindrical housing 25 by any appropriate means, exposing an interior wall of pressure head 30 to the interior of reservoir 20. A bore in pressure head 30 forms a compression chamber 70 having an insertion opening exposed to reservoir 20. Compression chamber 70 has a diameter which approximates the diameter of compression piston 45. Compression piston 45 is fittingly inserted into compression chamber 70 to allow compression of a lubricating agent in compression chamber 70. Compression chamber 70 has a length along the longitudinal axis of controlled stroke lubricant injector 10 which is equal to or greater than the length of the stroke of the machine tool that is to be controlled. An exhaust opening 75 leads from the end of compression chamber 70 to an adjacent air passage 80, which provides a passage to the exterior of reservoir 20. A needle valve 85 is inserted along exhaust opening 75 between compression chamber 70 and air passage 80. Needle valve 85 comprises a spring 90 which forces a ball 95 against a ball retainer 100. Ball 95 forms a seal against ball retainer 100 which prevents the flow of air or fluids from air passage 80 to the compression chamber. However, when the compression chamber is pressurized, ball 95 is forced against spring 90, allowing air or fluids to pass from compression chamber 70 through exhaust opening 75 and into adjacent air passage 80.

Pressure head 30 has a feedback port 105 which provides a passage from compression chamber 70 to the interior of reservoir 20. An adjuster 110 for regulating the pressure within compression chamber 70 comprises a screw that passes through pressure head 30 to intersect feedback port 105. Adjuster 110 allows an adjustment of the amount of fluid which can pass through feedback port 105 according to the portion of the adjustment screw that blocks feedback port 105. In other embodiments any adjuster for regulating the pressure in the compression chamber during the application of an axial force can be used. Pressure head 30 also has a refill port 115 which provides a passage from the exterior of pressure head 30 to the interior of reservoir 20. Refill cap 120 fits securely in refill port 115 to prevent fluid from leaking from reservoir 20, and is easily refilled by an automatic pump adapted to provide fluid through the cap 120. In an alternative embodiment, refill cap 120 is removable to allow refilling of reservoir 20 when fluid is needed.

A reservoir piston 125 is disposed in reservoir 20 coaxial to rod 15. Reservoir piston 125 has outer diameter seals 130 that prevent the passage of fluid where the outer diameter of reservoir piston 125 and the inner diameter of cylindrical housing 25 meet. Reservoir piston 125 also has inner diameter seals 125 which prevent the passage of fluid where the inner diameter of reservoir piston 125 meets the outer diameter of rod 15. Thus, reservoir piston 125 divides reservoir 20 into two portions, a proximate portion 140 adjacent to compression chamber 70, and a distal portion 145 adjacent to end cap 35. A piston spring 150 biases reservoir piston 125 away from end cap 35. Reservoir piston 125 slides along rod 15 so that a vacuum created by the filling of the compression chamber 70 with fluid from reservoir 20 will pull reservoir piston 125 towards compression chamber 70.

End cap 35 is coupled to cylindrical housing 25 by any appropriate means. Rod 15 passes through an opening in end cap 35. A bushing 155 located in the opening of end cap 35 maintains the alignment of rod 15 along the longitudinal axis of cylindrical housing 25. Bushing seals 160 located adjacent to bushing 155 ensure that fluid and air will not pass along the opening of end cap 35 into reservoir 20. A check valve 165 provides a passage from the exterior of end cap 35 to distal portion 145 of reservoir 20. Check valve 165 provides a passage that allows outside air to pass into distal portion 145 of reservoir 20 from the exterior of controlled stroke lubricant injector 10 when a vacuum in proximate portion 140 of reservoir 20 pulls reservoir piston 125 away from end cap 35. Check valve 165 does not allow air to exit reservoir 20, and should generally be removed during refilling. In one alternative embodiment, check valve 165 can be adjusted to a refill position to allow outside air to pass out of distal portion 145 of reservoir 29 when fluid added to reservoir 20 pushes reservoir piston 125 towards end cap 35.

FIG. 2 illustrates the cylindrical shape of cylindrical housing 25. In alternative embodiments, housing 25 could have other shapes as necessary to conveniently adapt controlled stroke lubricant injector 10 to any machine tool. FIG. 2 also illustrates that rod 15 transfers axial forces though housing 25 without providing obstructions to the vision of a machinist. In alternate embodiments, rod 15 could be placed outside of housing 25.

Referring now to FIG. 3, one embodiment of the present invention is depicted attached to an air-powered, hand-held drill 170. Although FIG. 3 shows an embodiment of the present invention attached to a 15 series air-powered drill sold by Intool Incorporated, the present invention could easily be adapted to attach to other cutting tools including drilling and reaming tools.

End cap 35 and pressure head 30 are securely coupled to the drill by any appropriate means. In the embodiment disclosed by FIG. 3, an adapter 175 diverts some pressurized air from drill 170 to air passage 80 in pressure head 30. Air passage 80 routes the diverted pressurized air past needle valve 85 and around drill 170 to drill bit 180, which acts as the cutting point for drill 170. Air passage 80 can include a flexible polymer tubing 81 to allow flexing of passage 80 as drill 170 is applied to a material.

Link 40 is coupled to rod 15 and nose 185. Nose 185 fits over drill 170 so that nose 185 can slide along the longitudinal axis of drill 170. When nose 185 slides toward drill 170, drill bit 180 is exposed. Link 40 translates the axial forces created by the movement of nose 185 to rod 15. In other embodiments, any appropriate means for transferring axial forces from nose 185 to rod 15 can be used.

In operation, a machinist couples the present invention to a machine tool, such as the Quackenbush 15 series airpowered drill, so that the machinist can control the rate of application of the tool, can provide a lubricating mist to the tool, or can do both of these functions simultaneously. A lubricating agent such as 10 weight machine oil is supplied to reservoir 20 through refill port 115. During the filling of reservoir 20, check valve 165 is removed to allow air to pass from distal portion 145 of reservoir 20 so that reservoir piston 125 can push up against end cap 35. Check valve 165 is then replaced, allowing refill cap 120 to automatically reset.

The machinist can then prepare the air-powered drill for use by providing pressurized air to adapter 175, causing drill bit 180 to spin. Nose 185 can be adjusted so that drill bit 180 is prevented from contacting the work piece to be machined. Compression chamber 70 is primed by ensuring that it is filled with lubricating agent and compression piston 45 is set in an initial position to allow a compression stroke equal in length to the anticipated stroke of the drill 170 against the work piece to be machined. Drill 170 is then applied against the work piece so that an axial pressurizing force pushes nose 185 along the longitudinal axis of drill 170. The axial pressurizing force is translated through link 40 to rod 15. Rod 15 compresses the lubricating agent in compression chamber 70. The compression of the lubricating agent creates a counter force to regulate the motion of drill 170.

The compression of the lubricating agent in the compression chamber causes the lubricating agent to pass through exhaust opening 75. Ball 95 in needle valve 85 comes off the seat formed by ball retainer 100, allowing fluid to pass through needle valve 85 into air passage 80 where it forms into a mist. The compressed lubricating agent also passes through feedback port 105 to return to reservoir 20, thus reducing the pressure in the compression chamber and allowing compression piston 45 to move into compression chamber 70. Feedback adjuster 110 regulates the amount of lubricating agent that passes through feedback port 105 and thus indirectly regulates the rate of motion of rod 15 and nose 185.

The lubricating agent that passes through needle valve 85 into air passage 80 can be metered at different rates as appropriate by altering the size of exhaust opening 75, by altering the strength of spring 90, by changing out different needle valves or by any other appropriate means. The lubricating agent proceeds with the aid of pressurized air from adapter 175 in a mist form through air passage 80 to the cutting point of the drill, which is drill bit 180. Flexible tubing 81 maintains air passage 80 as nose 320 moves. In the embodiment in FIG. 3, the lubricating mist is evenly distributed at the cutting point through distribution channel 190 which can encircle drill bit 180. In other embodiments, the lubricating mist can be distributed by any distribution port communicating between the exhaust opening 75 of compression chamber 70 and any lubrication point on the tool, or otherwise, where lubrication is desired.

A drilling operation is generally considered complete when the drill bit 180 completely penetrates the work piece. As drill bit 180 begins penetration of the work piece, nose 185 is pushed back along the longitudinal axis of drill 170. Nose 185 cooperates with link 40 to also push rod 15, which forces compression piston 45 into compression chamber 70. Upon relaxation of the longitudinal force against nose 185, return spring 195 forces compression piston 45 to return to its initial position in the compression chamber by providing an outward biasing reset force between end cap 35 and link 40. In one alternative embodiment, spring 195 could be located coaxial to sleeve 200, proximate to nose 185. Other appropriate means of returning rod 15 to an initial position can be used.

As compression piston 45 exits towards the insertion opening of compression chamber 70, ball 60 is forced off of its seat 55 by the lubricating agent proceeding from reservoir 20 through reset valve 50. Rod pin 65 prevents ball 60 from exiting reset valve 50. Thus, the reset force of return spring 195 forces rod 15 and compression piston 45 to their initial starting position while reset valve 50 allows communication between compression chamber 70 and reservoir 20. The use of reset valve 50 allows rapid fluid displacement to refill compression chamber 70 with lubricating agent from reservoir 20, but prevents fluid from passing from compression chamber 70 to reservoir 20 when a pressurizing force exists. The vacuum created by the flow of fluid from reservoir 20 into compression chamber 70 pulls reservoir piston 125 away from end cap 35. Check valve 165 allows air to fill the distal portion 145 of reservoir 20, thus allowing reservoir piston 125 to maintain the supply of lubricating agent in reservoir 20 available to reset valve 50 regardless of the vertical or horizontal orientation of controlled stroke lubricant injector 10.

The present invention can provide repeated cycles where the application rate of a machine tool is controlled and the cutting point of the machine tool is simultaneously lubricated until reservoir 20 is empty of lubricating agent. When the machinist notes a lack of resistance, he can refill reservoir 20 for further applications. Alternatively, adjuster 110 can be completely withdrawn from feedback port 105 so that rod 15 provides little if any counter force to movements of nose 185. In this mode the present invention fills the role of a lubricator, but not the role of a rate controller. In another embodiment, the exhaust opening 75 can be completely blocked allowing the present invention to fill the role of a rate controller without providing lubricating mist to air passage 80.

The present invention's use of lubricating agent as both a hydraulic fluid to provide a counter force and a lubricating mist to lubricate a cutting point provides several benefits. The controlled stroke lubricant injector adds less weight and fewer parts to a machine tool than separate rate controllers and lubricating devices add. The streamlined design of the present invention allows versatile placement in tight spots and better user visibility than can be obtained with separate rate controllers and lubricators. Further, the present invention can be designed to provide lubricating mist during cutting cycles without the need for manipulating a separate switch or device to initiate lubrication since lubrication can automatically commence upon initiation of an axial force. Further, because the present invention is designed to distribute lubricating agent, it can be built with seals that are less heavy duty than seals which are typically used to completely prevent leaking of hydraulic fluid in rate controllers.

Although the present invention has been described in detail, it should be understood that various changes, substitutions and alterations can be made hereto without departing from the spirit and scope of the invention as defined by the appended claims.

What is claimed is:

1. An apparatus for regulating the application of a tool to a work piece and for lubricating the tool, the apparatus comprising:

a pressure head having a compression chamber communicating with an exhaust opening;

a compression piston disposed in the compression chamber;

a pressure member coupled to the compression piston and cooperating with the tool to translate axial forces from the tool to the compression piston for compressing lubricating agent in the compression chamber; and an air passage adjacent to the exhaust opening, the air passage having a distribution port directed at a lubrication point.

2. The apparatus according to claim 1 further comprising:

an end cap; and a housing having first and second ends, the first end coupled to said end cap, the second end coupled to said pressure head, the end cap, pressure head and housing forming a reservoir.

3. The apparatus according to claim 2 further comprising a feedback port located in said pressure head, the feedback port providing a passage from the compression chamber to the reservoir.

4. The apparatus according to claim 3 further comprising an adjuster disposed through the feedback port for regulating the flow of fluids from the compression chamber to the reservoir.

5. The apparatus according to claim 2 further comprising a reset valve providing a passage from the reservoir to the compression chamber, the valve having a closed position if the pressure member experiences a pressurizing force, and the valve having an open position if the pressure member experiences a reset force.

6. The apparatus according to claim 5 wherein the reset valve is located in the compression piston.

7. The apparatus according to claim 5 further comprising a reservoir piston disposed in the reservoir, said reservoir piston dividing the reservoir into a first portion distal from the compression chamber and a second portion proximate to the compression chamber; and a check valve providing a passage between the distal portion and the exterior air for equalizing the air pressure in the distal portion when the reservoir piston moves toward the compression chamber.

8. The apparatus according to claim 1 wherein the tool comprises a drill, the apparatus further comprising:

a nose cooperating with the drill, the nose adapted to move along the longitudinal axis of the drill; and a link coupled to said nose and said pressure member, said link adapted to translate axial force from said nose to said pressure member.

9. The apparatus according to claim 8 wherein the drill has a drill bit having a cutting point and wherein the nose has a distribution channel for accepting lubricating mist from the air passage and distributing the lubricating mist to the cutting point of the drill.

10. A controlled stroke lubricator comprising:

a housing having first and second ends;

an end cap coupled to the first end of said housing, the end cap having an opening;

a pressure head coupled to the second end of said housing to form a reservoir having an interior and an exterior, said pressure head having a compression chamber and an exhaust opening, the exhaust opening providing a passage from the compression chamber to the exterior of the reservoir;

a pressure member disposed through the opening of said end cap;

a compression piston coupled to said pressure member and disposed in the compression chamber; and lubricating agent provided in the interior of the reservoir and in the compression chamber.

11. The apparatus according to claim 10 further comprising a reset valve communicating between the reservoir and the compression chamber for allowing rapid displacement of lubricating agent from the reservoir into the compression chamber when a reset force is applied to the pressure member.

12. The apparatus according to claim 11 further comprising:

a feedback port providing a passage between the compression chamber and the reservoir; and an adjuster communicating with the feedback port for regulating the amount of fluid that flows through the feedback port.

13. The apparatus according to claim 11 further comprising a needle valve disposed in the exhaust opening of the pressure head.

14. The apparatus according to claim 13 further comprising an air passage adjacent to the exhaust opening for distributing lubricating agent from the exhaust opening to a cutting point.

15. The apparatus according to claim 14 further comprising a reservoir piston disposed in the reservoir for maintaining a supply of lubricating agent to the reset valve.

16. The apparatus according to claim 14 further comprising a link cooperating with the pressure member for translating axial forces to the pressure member.

17. A method for controlling the rate of application for a machine tool, the method comprising the steps of:

providing lubricating agent in a compression chamber, the compression chamber having an exhaust opening;

applying an axial force to the machine tool;

translating the axial force to the compression chamber to compress the lubricating agent and create a counter force;

controlling the rate of application of the machine tool with the counter force of the translating the axial force step; and directing lubricating agent from the exhaust opening to a lubrication point.

18. The method according to claim 17 wherein the lubrication point is a cutting point.

19. The method according to claim 17 further comprising the steps of:

storing lubricating agent in a reservoir; and providing stored lubricating agent from the reservoir to the compression chamber.

20. The method according to claim 19 further comprising the steps of:

regulating the pressure of the compression chamber by diverting a predetermined amount of pressurized lubricating agent from the compression chamber through a feedback passage and into the reservoir.

* * * * *